(12) United States Patent
Gregg et al.

(10) Patent No.: US 11,319,926 B2
(45) Date of Patent: May 3, 2022

(54) SYSTEM AND METHOD FOR PROTECTING WIND TURBINES FROM EXTREME AND FATIGUE LOADS

(71) Applicant: General Electric Company, Schenectady, NY (US)

(72) Inventors: Peter Alan Gregg, Niskayuna, NY (US); Danian Zheng, Fairfield, CT (US)

(73) Assignee: General Electric Company, Schenectady, NY (US)

( * ) Notice: Subject to any disclaimer, the term of this patent is extended or adjusted under 35 U.S.C. 154(b) by 269 days.

(21) Appl. No.: 16/166,499

(22) Filed: Oct. 22, 2018

(65) Prior Publication Data

US 2020/0124024 A1 Apr. 23, 2020

(51) Int. Cl.
| | | |
|---|---|---|
| *F03D 7/02* | (2006.01) | |
| *F03D 17/00* | (2016.01) | |
| *F03D 7/04* | (2006.01) | |

(52) U.S. Cl.
CPC .......... *F03D 7/0292* (2013.01); *F03D 7/042* (2013.01); *F03D 17/00* (2016.05);
(Continued)

(58) Field of Classification Search
CPC .... F03D 7/0292; F03D 7/0264; F03D 7/0268; F03D 7/042; F03D 17/00; F05B 2200/13;
(Continued)

(56) References Cited

U.S. PATENT DOCUMENTS

| | | | |
|---|---|---|---|
| 6,619,918 B1 * | 9/2003 | Rebsdorf | ................ F03D 17/00 416/1 |
| 7,175,389 B2 | 2/2007 | Moroz | |

(Continued)

FOREIGN PATENT DOCUMENTS

| | | | | |
|---|---|---|---|---|
| CN | 1975155 A | * | 6/2007 | ........... F03D 7/0276 |
| EP | 2159418 A2 | * | 3/2010 | ........... F03D 7/0264 |

(Continued)

OTHER PUBLICATIONS

European Search Report, dated Mar. 20, 2020 for EP Application No. 19203846.1.

*Primary Examiner* — David E Sosnowski
*Assistant Examiner* — Wayne A Lambert
(74) *Attorney, Agent, or Firm* — Dority & Manning, P.A.

(57) ABSTRACT

A method for protecting a wind turbine from extreme and fatigue loads associated with high wind speed events includes receiving, via a wind turbine condition estimator programmed in a turbine controller of the wind turbine, operating data indicative of current wind turbine operation. Further, the method includes determining, via the wind turbine condition estimator, a plurality of estimated wind turbine conditions at the wind turbine by solving a control algorithm having one or more equations using the operating data. The estimated wind turbine conditions include, at least, an estimated wind speed at the wind turbine and a loading proxy of the wind turbine. As such, the method includes implementing, via the turbine controller, a corrective action only when each of the estimated wind turbine conditions indicates that one or more loading conditions of the wind turbine exceeds a predetermined limit.

9 Claims, 4 Drawing Sheets

(52) U.S. Cl.
CPC ... *F05B 2200/13* (2013.01); *F05B 2260/8211* (2013.01); *F05B 2270/1095* (2013.01); *F05B 2270/32* (2013.01); *F05B 2270/404* (2013.01); *F05B 2270/80* (2013.01)

(58) Field of Classification Search
CPC ........ F05B 2260/821; F05B 2260/8211; F05B 2260/84; F05B 2270/1077; F05B 2270/1095; F05B 2270/32; F05B 2270/404; F05B 2270/80; F05B 2270/331; F05B 2270/332; Y02E 10/72
See application file for complete search history.

(56) References Cited

U.S. PATENT DOCUMENTS

| | | | |
|---|---|---|---|
| 7,281,891 B2 | 10/2007 | Smith et al. | |
| 7,342,323 B2 | 3/2008 | Avagliano et al. | |
| 7,346,462 B2 | 3/2008 | Delmerico | |
| 7,351,033 B2* | 4/2008 | McNerney | F03D 7/0224 416/1 |
| 7,505,833 B2 | 3/2009 | Delmerico et al. | |
| 7,613,548 B2 | 11/2009 | Cardinal et al. | |
| 7,822,560 B2 | 10/2010 | LeMieux | |
| 7,861,583 B2 | 1/2011 | Honhoff et al. | |
| 7,942,629 B2 | 5/2011 | Shi et al. | |
| 7,964,979 B2* | 6/2011 | Miranda | G05B 13/021 290/44 |
| 7,979,167 B2 | 7/2011 | Delmerico et al. | |
| 8,025,476 B2 | 9/2011 | Zheng et al. | |
| 8,050,887 B2 | 11/2011 | Ahmarm | |
| 8,257,040 B2 | 9/2012 | Chen et al. | |
| 9,062,653 B2* | 6/2015 | Brath | F03D 7/042 |
| 9,587,628 B2* | 3/2017 | Narayana | F03D 7/0224 |
| 9,605,558 B2 | 3/2017 | Perley et al. | |
| 9,745,958 B2* | 8/2017 | Agarwal | F03D 7/0264 |
| 2007/0075546 A1 | 4/2007 | Avagliano et al. | |
| 2008/0086281 A1 | 4/2008 | Santos | |
| 2009/0047116 A1 | 2/2009 | Earbu et al. | |
| 2009/0108582 A1 | 4/2009 | Seibers et al. | |
| 2011/0084485 A1 | 4/2011 | Miranda et al. | |
| 2011/0140431 A1 | 6/2011 | Landa et al. | |
| 2012/0027566 A1* | 2/2012 | Boerlage | F03D 7/04 415/1 |
| 2012/0128488 A1 | 5/2012 | Kristoffersen | |
| 2012/0263601 A1 | 10/2012 | Baker et al. | |
| 2013/0033040 A1 | 2/2013 | Bowyer et al. | |
| 2013/0156577 A1 | 6/2013 | Ebensen et al. | |
| 2013/0204447 A1 | 8/2013 | Bjerge et al. | |
| 2014/0037447 A1 | 2/2014 | Attia | |

FOREIGN PATENT DOCUMENTS

| | | | |
|---|---|---|---|
| EP | 2302206 A1 | 3/2011 | |
| EP | 2 538 074 A2 | 12/2012 | |
| GB | 2476316 B | 7/2014 | |
| KR | 20090071550 A * | 7/2009 | ........... F03D 7/0264 |
| WO | WO-0242641 A1 * | 5/2002 | ............ F03D 7/042 |
| WO | WO2012/097814 A1 | 7/2012 | |
| WO | WO2012/103668 A1 | 8/2012 | |
| WO | WO2012/152280 A1 | 11/2012 | |
| WO | WO2013/083130 A1 | 6/2013 | |

* cited by examiner

SYSTEM AND METHOD FOR PROTECTING WIND TURBINES FROM EXTREME AND FATIGUE LOADS

FIELD

The present invention relates generally to wind turbines, and more particularly, to systems and methods for protecting wind turbines from extreme and fatigue loads associated with high wind speed events.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Power output of the generator increases with wind speed until the wind speed reaches a rated wind speed for the turbine. At and above the rated wind speed, the generator operates at a rated power. The rated power is an output power at which the generator can operate with a level of fatigue or extreme load to turbine components that is predetermined to be acceptable. During high wind speed events, the wind turbine can experience damaging loads, such as during storms or wind gusts. As such, at wind speeds higher than a certain speed, typically referred to as a "trip limit," the wind turbine may implement a control action, such as shutting down the wind turbine in order to protect wind turbine components from damage.

Historically, wind has been used as a proxy for loads for storm shutdown protection. However, wind speed alone can be a poor proxy for loading on turbine components, particularly at high wind speeds, where wind sensors are typically only designed for wind speeds in the range of about 4 meters/second (m/s) to about 12 m/s. In other words, direct wind speed measurements at high wind speeds near the turbine design cut-out speed (e.g. around 30 m/s) can be inaccurate.

Additionally, turbine operation, such as changes in blade pitch angle or rotor speed, may also influence the accuracy of the measurement because the sensor is no longer measuring a free stream wind once it flows past the rotor. Such wind speed inaccuracies can either cause the wind turbine to shut down too soon (i.e. resulting in lost energy production and excessive fatigue loading due to cycling) or allow the wind turbine to continue to run when loads mitigation should be implemented (i.e. resulting in extreme or excessive fatigue loads damage).

Further, the relationship between nacelle wind speed and free stream wind speed changes when the turbine is offline. Inaccuracies in the offline wind speed can either result in the wind turbine restarting too soon (i.e. resulting in storm shutdown cycling which causes excessive fatigue damage) or in the wind turbine staying offline too long (i.e. resulting in lost energy production).

Accordingly, systems and methods for protecting wind turbines from extreme and fatigue loads associated with high wind speed events so as to reduce the shut down time and/or reduce the number of trips associated with conventional control schemes would be desired in the art.

BRIEF DESCRIPTION

Aspects and advantages of the invention will be set forth in part in the following description, or may be obvious from the description, or may be learned through practice of the invention.

In one aspect, the present disclosure is directed to a method for protecting a wind turbine from extreme and fatigue loads associated with high wind speed events. The method includes receiving, via a wind turbine condition estimator programmed in a turbine controller of the wind turbine, operating data indicative of current wind turbine operation. Further, the method includes determining, via the wind turbine condition estimator, a plurality of estimated wind turbine conditions at the wind turbine by solving a control algorithm having one or more equations using the operating data. The estimated wind turbine conditions include, at least, an estimated wind speed at the wind turbine and a loading proxy of the wind turbine. As such, the method includes implementing, via the turbine controller, a corrective action only when each of the estimated wind turbine conditions indicates that one or more loading conditions of the wind turbine exceeds a predetermined limit.

In one embodiment, the predetermined storm threshold may include wind speeds greater than about 20 meters/second. In another embodiment, the loading proxy may include, for example, a loading (actual or estimated) of one or more wind turbine components, air density, wind turbulence, wake from neighboring turbines, and/or any suitable parameter that can be used as a proxy for loading of the wind turbine.

In further embodiments, determining the plurality of estimated wind turbine conditions at the wind turbine using the control algorithm having the one or more equations may include, for example, solving, via the wind turbine condition estimator, the one or more equations using the operating data and one or more aerodynamic performance maps and determining the plurality of estimated wind turbine conditions based on the solved equations.

In certain embodiments, the operating data may include, for example, pitch angle, generator speed, rotor speed, power output, generator torque, yaw angle, one or more environmental conditions, data from one or more loading sensors of the wind turbine, or functions thereof. In particular embodiments, the environmental condition(s) may include wind speed, air density, ambient temperature, pressure, humidity, presence of precipitation, wind direction, wind gust, wind shear, wind acceleration, wind turbulence, wind veer, wake, or wind deviation.

In further embodiments, the method may include determining, via the wind turbine condition estimator, the plurality of estimated wind turbine conditions at the wind turbine online and in real-time.

In several embodiments, implementing the corrective action when each of the estimated wind turbine conditions indicates that the loading condition(s) of the wind turbine exceeds the predetermined limit may include shutting down the wind turbine or derating the wind turbine. In yet another embodiment, the method may include determining, via the wind turbine condition estimator, an estimated wind speed offline after implementing the corrective action and restarting the wind turbine or uprating the wind turbine only after the estimated wind speed is below the predetermined limit.

In another aspect, the present disclosure is directed to a system for protecting a wind turbine from extreme and fatigue loads associated with high wind speed events. The system includes a turbine controller having at least one processor with a wind turbine condition estimator stored therein. As such, the wind turbine estimator determines a plurality of estimated wind turbine conditions at the wind turbine by solving a control algorithm having one or more equations using operating data indicative of current wind turbine operation. The plurality of estimated wind turbine conditions includes, at least, an estimated wind speed at the wind turbine and a loading proxy of the wind turbine. The turbine controller further implements a corrective action when each of the plurality of estimated wind turbine conditions indicate that one or more loading conditions of the wind turbine exceeds a predetermined limit. The system may also include any of the additional features as described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
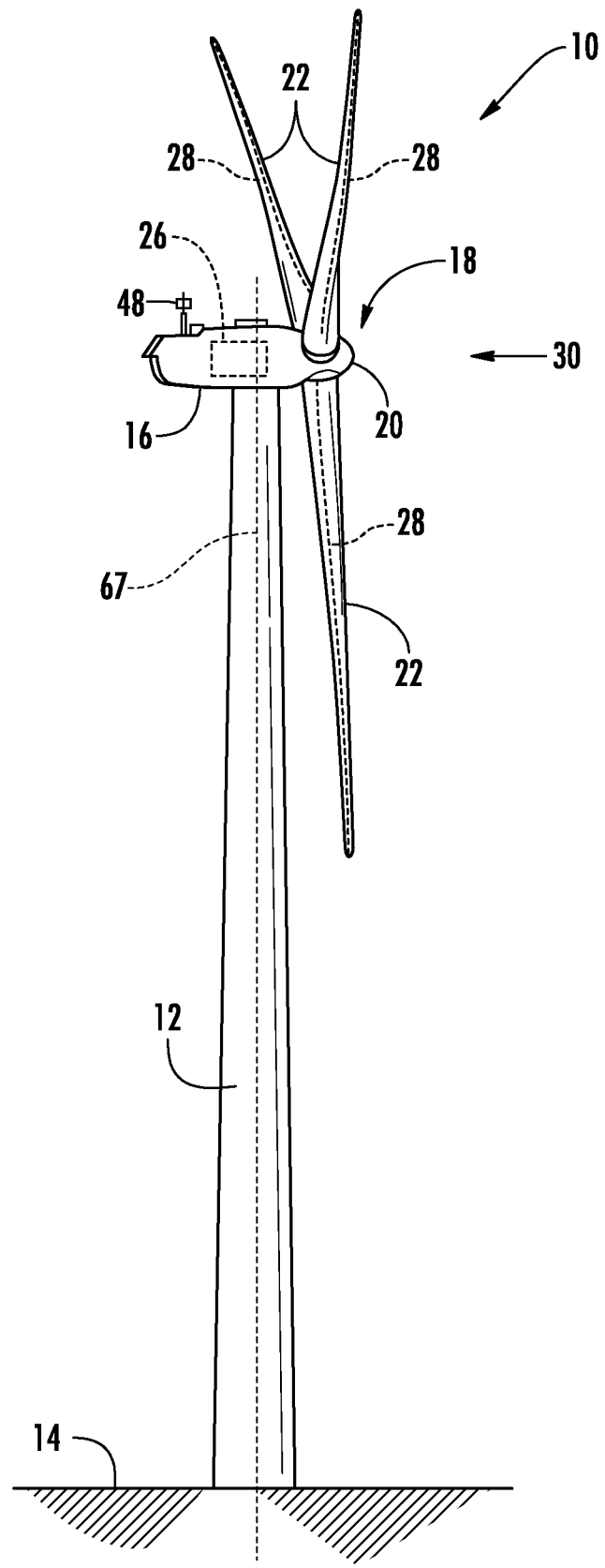
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. In other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or uprating the wind turbine, and/or individual components of the wind turbine 10.

Figure 2:
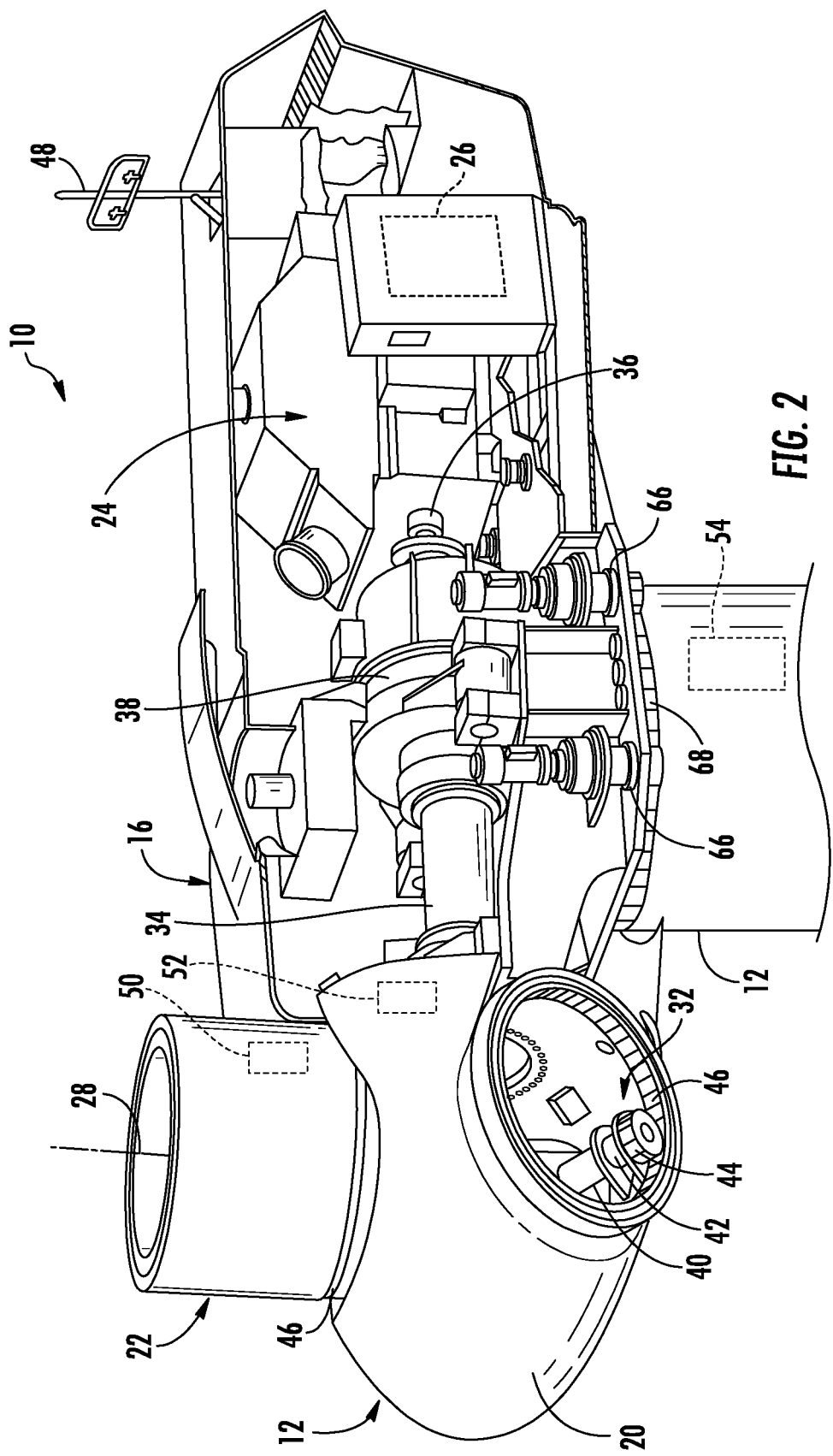
FIG. 2 illustrates a simplified, internal view of one embodiment of a nacelle of a wind turbine.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Still referring to FIG. 2, each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind direction 30 (e.g., by engaging a yaw bearing 68 of the wind turbine 10 so as to rotate the nacelle about a yaw axis 67 (FIG. 1)).

Figure 3:
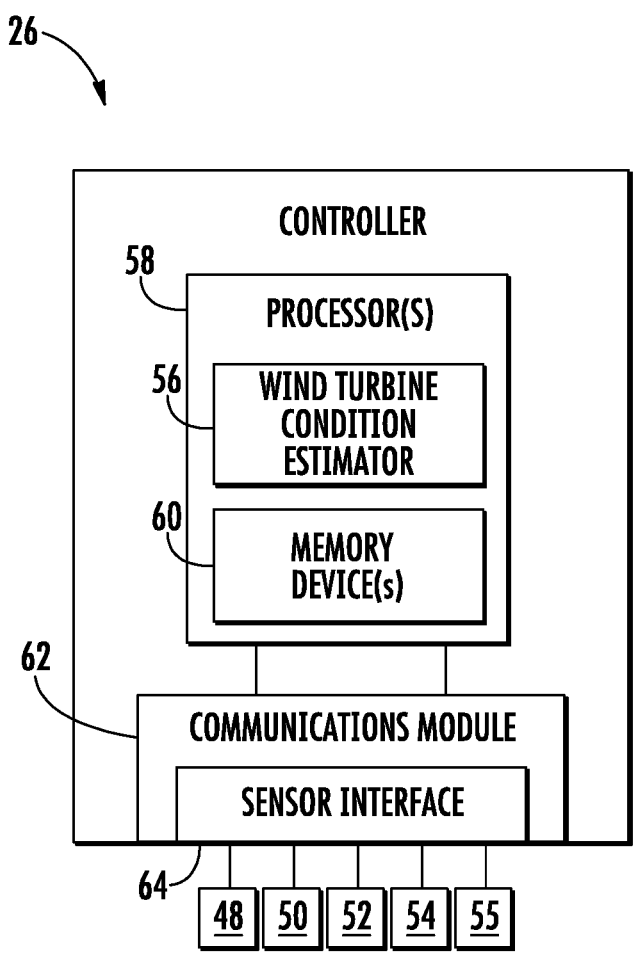
FIG. 3 illustrates a schematic diagram of one embodiment of a controller according to the present disclosure.

Referring to FIGS. 1-3, the wind turbine 10 may include one or more sensors 48, 50, 52, 54, 55 for measuring various wind or operational parameters of the wind turbine 10. For example, as shown in FIG. 1, sensor 48 may be located on the nacelle 16 and/or the hub 20 so as to measure an actual wind parameter from the wind turbine 10. The actual wind parameter may be any of the following: a wind gust, a wind speed, a wind direction, a wind acceleration, a wind turbulence, a wind shear, a wind veer, a wake, or similar. Further, the one or more sensors may include at least one LIDAR sensor for measuring upwind parameters. In additional embodiments, the sensors 48, 50, 52, 54, 55 may be any other suitable sensors capable of measuring wind and/or operational parameters of the wind turbine 10. For example, as shown in FIG. 2, sensors 50, 52, 54 may be configured to measure various conditions of the rotor blades 22, the hub 20, and/or the tower 12 (such as loading, deflection, twist, etc.). Further, sensor 55 may be used to monitor generator torque, speed, and/or power output of the wind turbine 10.

The sensors 48, 50, 52, 54, 55 described herein may include, for example, proximity sensors, strain gauges, accelerometers, pressure sensors, angle of attack sensors, motion sensors, vibration sensors, micro inertial measurement units (MIMUs), camera or imaging sensors, fiber optic sensors, anemometers, wind vanes, Sonic Detection and Ranging (SODAR) sensors, Light Ranging and Detection (LIDAR) sensors, radiometers, pitot tubes, rawinsondes, and/or any other suitable sensors. It should be appreciated that, as used herein, the term "monitor" and variations thereof indicates that the various sensors of the wind turbine may be configured to provide a direct measurement of the parameters being monitored or an indirect measurement of such parameters. Thus, the sensors 48, 50, 52, 54, 55 may, for example, be used to generate signals relating to the parameter being monitored, which can then be utilized by the controller 26 to determine the actual condition.

Referring specifically to FIG. 3, there is illustrated a block diagram of one embodiment of the controller 26 according to the present disclosure. As shown, the controller 26 may include one or more processor(s) 58, a wind turbine condition estimator 56, and associated memory device(s) 60 configured to perform a variety of computer-implemented functions (e.g., performing the methods, steps, calculations and the like and storing relevant data as disclosed herein). Additionally, the controller 26 may also include a communications module 62 to facilitate communications between the controller 26 and the various components of the wind turbine 10. Further, the communications module 62 may include a sensor interface 64 (e.g., one or more analog-to-digital converters) to permit signals transmitted from the sensors 48, 50, 52, 54, 55 to be converted into signals that can be understood and processed by the processors 58. It should be appreciated that the sensors 48, 50, 52, 54, 55 may be communicatively coupled to the communications module 62 using any suitable means. For example, as shown in FIG. 3, the sensors 48, 50, 52, 54, 55 are coupled to the sensor interface 64 via a wired connection. However, in other embodiments, the sensors 48, 50, 52, 54, 55 may be coupled to the sensor interface 64 via a wireless connection, such as by using any suitable wireless communications protocol known in the art. As such, the processor 58 may be configured to receive one or more signals from the sensors 48, 50, 52, 54, 55.

The wind turbine condition estimator 56 may be considered software that utilizes the various wind and/or operational parameters to calculate, in real-time, an estimated wind turbine condition. Further, the wind turbine condition estimator 56 may comprise firmware that includes the software, which may be executed by the processor 58. Further, the wind turbine condition estimator 56 may be in communication the various sensors and components of the wind turbine 10, which may provide the operating data to the wind turbine condition estimator 56.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions including, but not limited to, estimating one or more wind parameters of the wind turbine 10 based on the operating data, transmitting suitable control signals to implement control actions in response to the detection of transient wind conditions and various other suitable computer-implemented functions.

Figure 4:
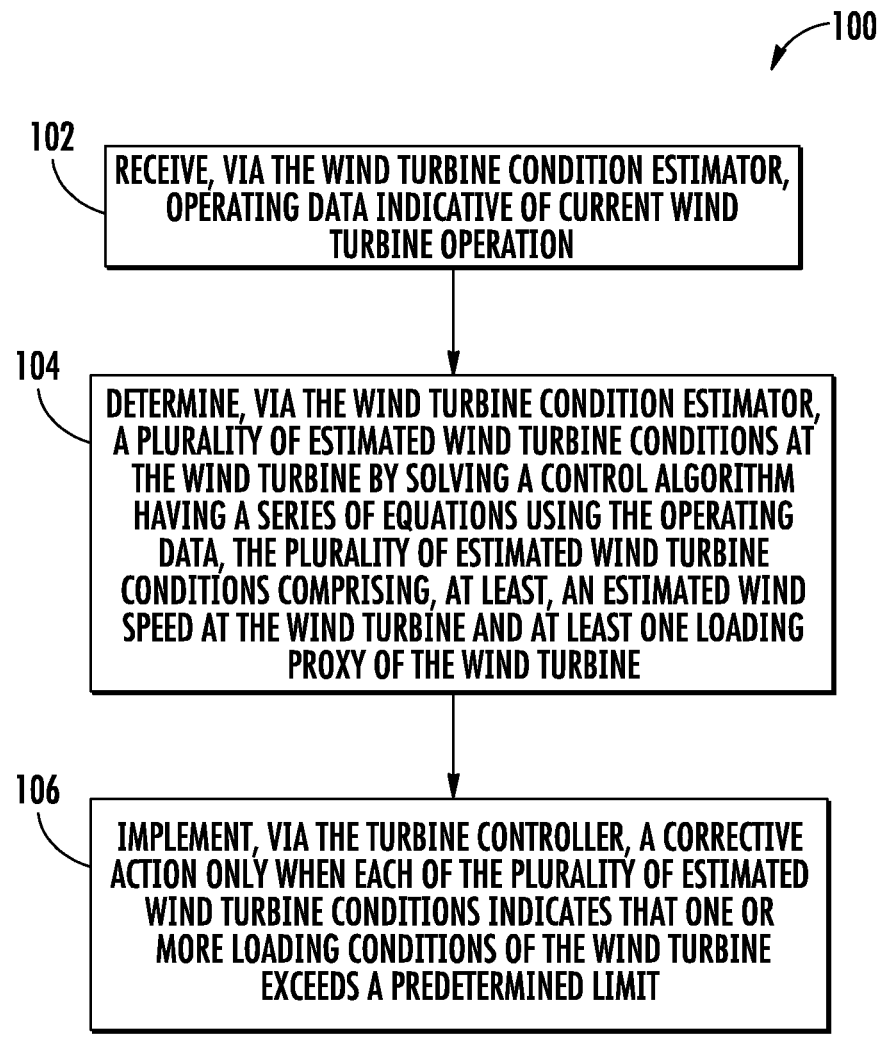
FIG. 4 illustrates a flow diagram of one embodiment of a method for protecting a wind turbine from extreme and fatigue loads associated with high wind speed events according to the present disclosure.

Referring now to FIG. 4, a flow diagram of one embodiment of a method 100 for protecting a wind turbine from extreme and fatigue loads associated with high wind speed events is illustrated. In general, the method 100 will be described herein with reference to the wind turbine 10 and controller 26 shown in FIGS. 1-3. However, it should be appreciated that the disclosed method 100 may be implemented with wind turbines having any other suitable configurations. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

For example, as shown at (102), the method 100 may include receiving, via the wind turbine condition estimator 56, operating data indicative of current wind turbine operation. Such operating data may include, for example, pitch angle, generator speed, rotor speed, power output, generator torque, yaw angle, one or more environmental conditions, data from one or more loading sensors of the wind turbine 10, or functions thereof (e.g. standard deviation, average, mean, median, etc.). In further embodiments, the environmental condition(s) may include wind speed, air density, ambient temperature, pressure, humidity, presence of precipitation, wind direction, wind gust, wind shear, wind acceleration, wind turbulence, wind veer, wake, or wind deviation.

As mentioned, conventional wind sensors are typically only designed for wind speeds in the range of about 4 meters/second (m/s) to about 12 m/s. Additionally, the estimated wind speed is representative of what the entire rotor 18 sees, whereas the wind speed sensor is typically a point measurement at the turbine rotor centerline. Accordingly, the estimated wind speed is advantageous from a loads perspective versus the sensor wind speed as a proxy for loads. Thus, during high wind speeds, such as during a storm, direct wind speed measurements cannot be used to accurately measure the wind speed. Thus, when the wind speed exceeds a predetermined storm threshold, the controller 26 is configured to determine a loading proxy for wind speed that more accurately estimates loading on the wind turbine 10 before implementing a corrective action, such as those described herein. More specifically, in certain embodiments, the predetermined storm threshold may include wind speeds greater than about 20 meters/second (m/s), such as greater than about 30 m/s.

For example, as shown at (104), the method 100 may include determining, via the wind turbine condition estimator 56, a plurality of estimated wind turbine conditions at the wind turbine 10 by solving a control algorithm having one or more equations using the operating data, which will be discussed in more detail below. The estimated wind turbine conditions may include, for example, an estimated wind speed at the wind turbine 10 and/or a loading proxy of the wind turbine 10. In addition, the loading proxy may include, for example, a loading (actual or estimated) of one or more wind turbine components, air density, wind turbulence, wake from neighboring turbines in a wind farm, and/or any suitable parameter that can be used as a proxy for loading of the wind turbine 10. As used herein, the wake from neighboring turbines in a wind farm generally refers to a reduction in wind speed and an increase in turbulence at a downstream wind turbine caused by an upstream wind turbine extracting energy from the wind. Thus, the wake effect is the aggregated influence on the energy production of the wind farm, which results from the changes in wind speed caused by the impact of the wind turbines on each other. In one embodiment, the wind turbine condition estimator 56 may determine the estimated wind turbine condition(s) by receiving the operating data indicative of current wind turbine operation, i.e. online and in real-time. As such, the wind turbine condition estimator 56 can then calculate the estimated wind turbine condition(s) as a function of various combinations of the operating data. In one embodiment, for example, the wind turbine condition estimator 56 may implement the control algorithm having one or more equations to determine the estimated wind turbine condition as a function of the pitch angle, the generator speed, the power output, and the air density.

In further embodiments, the equations may be solved using the operating data and one or more aerodynamic performance maps. For example, in one embodiment, the aerodynamic performance maps may be dimensional or non-dimensional tables that describe rotor loading and performance (e.g. power, thrust, torque, or bending moment, or similar) under given conditions (e.g. density, wind speed, rotor speed, pitch angles, or similar). As such, the aerodynamic performance maps may include: power coefficient, thrust coefficient, torque coefficient, and/or partial derivatives with respect to pitch angle, rotor speed, or tip speed ratio. Alternatively, the aerodynamic performance maps can be dimensional power, thrust, and/or torque values instead of coefficients.

Further, the wind turbine estimator 56 may also include one or more look-up tables (LUTs). In various embodiments, at least some of the LUTs may include: a wind turbine thrust, a blade loading, a tower loading, a shaft loading, a nacelle loading, a hub loading, or any other wind turbine loading condition. As such, depending on the embodiment, the estimated wind turbine condition(s) may be representative of wind parameters at or near the wind turbine 10 and/or loading conditions of the wind turbine 10. As mentioned, the wind parameters may include wind speed, wind gust, wind direction, wind acceleration, wind turbulence, wind shear, wind veer, wake, wind deviation, or similar. Loading conditions may include, for example, thrust, blade loading, tower loading, shaft loading, nacelle loading, hub loading, blade tower clearance, or similar.

Thus, in certain embodiments, the wind turbine condition estimator 56 may include an aerodynamic performance maps for blade pitch angle, tip speed ratio (TSR), efficiency, and/or any suitable turbine operational parameters. As such, in one embodiment, if the wind speed, power, and rotor speed, and the pitch angle are known, then the wind turbine condition estimator 56 is configured to lookup the power coefficient (i.e. $C_p$). Therefore, the estimated wind speed may be calculated according to Equation (1) below:

$$\text{Wind Speed} = 0.5 * \rho * A * V^3 * C_p \qquad \text{Equation (1)}$$

Wherein $\rho$ is the density,
A is the rotor area,
V is the measured wind speed, and
Cp is the power coefficient.

In certain embodiments, the wind turbine condition estimator 56 may also include a wake model, where the input to the wake model includes, at a minimum, the wind speed and wind direction and the distance between neighboring turbines of the wind farm. As such, the wake model is configured to output an adjusted wind speed, wind speed profile (shear) and/or an increase in turbulence caused by the upwind wind turbine(s). Loading models can then model the increase in loads due to the wake based off of the change in wind conditions caused by the wake, specifically wake induced turbulence (although the adjusted wind speed and wind profile may be used as well).

Once the estimated wind turbine condition(s) is calculated, the controller 26 may use the estimated wind turbine condition(s) in various ways. For example, in one embodiment, as shown at (106), the method 100 may include implementing, via the turbine controller 26, a corrective action only when each of the plurality of estimated wind turbine conditions indicates that one or more loading conditions of the wind turbine 10 exceeds a predetermined limit.

The corrective action(s) as described herein may be any suitable control action so as to reduce loads acting on the wind turbine. For example, in several embodiments, the corrective action may include shutting down the wind turbine or temporarily de-rating the wind turbine to permit the loads acting on or more of the wind turbine components to be reduced or otherwise controlled. De-rating the wind turbine 10 may include, for example, speed de-rating, torque de-rating or a combination of both. Further, the wind turbine 10 may be de-rated by reducing speed and increasing torque, which can be beneficial so as to maintain power. In another embodiment, the wind turbine 10 may be de-rated by pitching one or more of the rotor blades 22 about its pitch axis 28. More specifically, the controller 26 may generally control each pitch adjustment mechanism 32 in order to alter the pitch angle of each rotor blade 22 between −10 degrees (i.e., a power position of the rotor blade 22) and 90 degrees (i.e., a feathered position of the rotor blade 22). In still another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 26 by transmitting a suitable control signal/command to the generator 24 in order to modulate the magnetic flux produced within the generator 24.

The wind turbine 10 may also be temporarily de-rated by yawing the nacelle 16 to change the angle of the nacelle 16 relative to the direction of the wind 30. In other embodiments, the controller 26 may be configured to actuate one or more mechanical brake(s) or activate an airflow modifying element on the rotor blade(s) 22 in order to reduce the rotational speed and/or load of the rotor blades 22, thereby reducing component loading. In still further embodiments, the controller 26 may be configured to perform any appropriate control action known in the art. Further, the controller 26 may implement a combination of two or more control actions.

In yet another embodiment, the wind turbine condition estimator 56 may also be configured to determine an estimated wind speed offline, i.e. after implementing the corrective action, and restarting the wind turbine 10 or uprating the wind turbine 10 only after the estimated wind speed is below the predetermined limit. Such control steps prevent the wind turbine 10 from being restarted too early, e.g. due to a wind sensor inaccurately determining the wind speed due to the stopped rotation of the rotor 18.

It should also be appreciated that an advantage of the present invention is that the system and method may be implemented using existing components of the wind turbine 10. As such, a user is not required to purchase, install, and maintain new equipment. Further, the controller 26 may be integrated with a broader control system, such as, but not limiting of, a wind turbine control system, a plant control system, a remote monitoring system, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for protecting a wind turbine from extreme and fatigue loads associated with high wind speed events, the method comprising:
    receiving an indication from wind speed sensors that wind speed measurements exceed a predetermined storm threshold and cannot be used due to the high wind speed events;
    in response to receiving the indication, receiving, via a wind turbine condition estimator programmed in a turbine controller of the wind turbine, operating data indicative of current wind turbine operation, the operating data comprising pitch angle, rotor speed, power output, generator torque, yaw angle, one or more environmental conditions, and data from one or more loading sensors of the wind turbine;
    estimating, via the wind turbine condition estimator, a plurality of estimated wind turbine conditions at the wind turbine by solving a control algorithm having one or more equations using the operating data, the plurality of estimated wind turbine conditions comprising, at least, an estimated wind speed at the wind turbine and at least one loading proxy of the wind turbine; and,
    implementing, via the turbine controller, a corrective action only when each of the estimated wind speed at the wind turbine and the at least one loading proxy of the wind turbine indicates that one or more loading conditions of the wind turbine exceeds a predetermined limit.

2. The method of claim 1, wherein the predetermined storm threshold comprises wind speeds greater than about 20 meters/second.

3. The method of claim 1, wherein the loading proxy comprises at least one of a loading of one or more wind turbine components, air density, wind turbulence, and/or wake from neighboring turbines.

4. The method of claim 1, wherein determining, via the wind turbine condition estimator programmed in the turbine controller of the wind turbine, the plurality of estimated wind turbine conditions at the wind turbine using the control algorithm having the one or more equations further comprises:
    solving, via the wind turbine condition estimator, the one or more equations using the operating data and one or more aerodynamic performance maps, the one or more aerodynamic performance maps being dimensional or non-dimensional tables that describe rotor loading and performance under given conditions, the given conditions comprising density, wind speed, rotor speed, and pitch angle; and,
    determining the plurality of estimated wind turbine conditions based on the solved equations.

5. The method of claim 1, wherein the operating data comprises at least one of pitch angle, generator speed, rotor speed, power output, generator torque, yaw angle, one or more environmental conditions, data from one or more loading sensors of the wind turbine, or functions thereof.

6. The method of claim 5, wherein the one or more environmental conditions comprises at least one of wind speed, air density, ambient temperature, pressure, humidity, presence of precipitation, wind direction, wind gust, wind shear, wind acceleration, wind turbulence, wind veer, wake, or wind deviation.

7. The method of claim 1, further comprising determining, via the wind turbine condition estimator, the plurality of estimated wind turbine conditions at the wind turbine online and in real-time.

8. The method of claim 1, wherein implementing the corrective action when each of the plurality of estimated wind turbine conditions indicate that the one or more loading conditions of the wind turbine exceeds the predetermined limit further comprises at least one of shutting down the wind turbine or derating the wind turbine.

9. The method of claim 8, further comprising:
    determining, via the wind turbine condition estimator, an estimated wind speed offline after implementing the corrective action; and,
    restarting the wind turbine or uprating the wind turbine only after the estimated wind speed is below the predetermined limit.

* * * * *